United States Patent Office 3,600,492
Patented Aug. 17, 1971

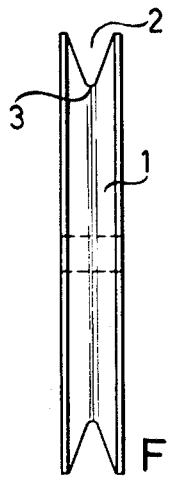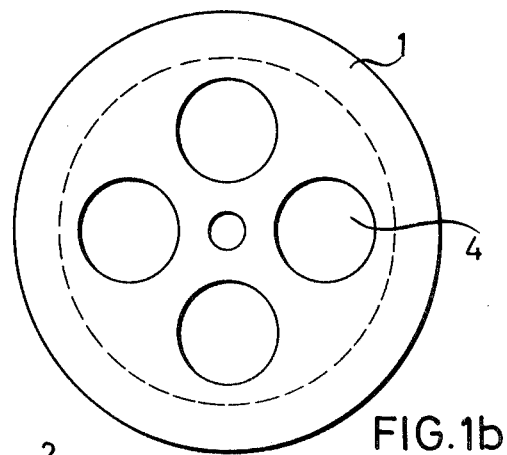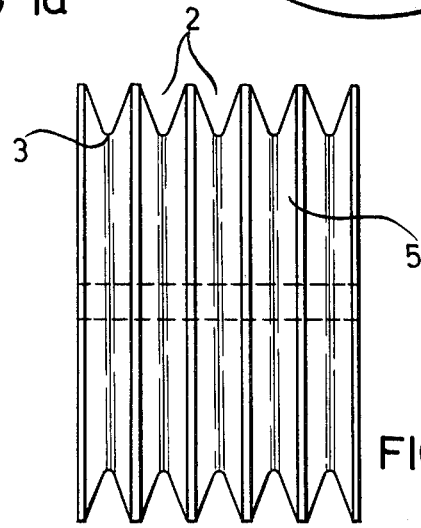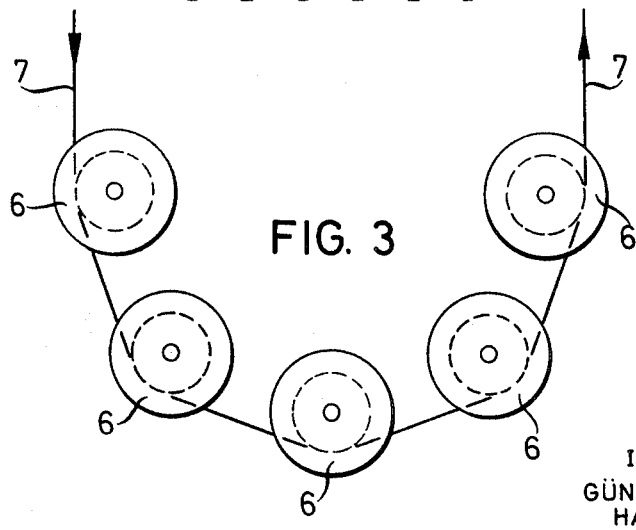

3,600,492
PROCESS AND DEVICE FOR THE MANUFACTURE OF MONOFILAMENTS OF CIRCULAR CROSS-SECTION MADE OF SYNTHETIC LINEAR HIGH-POLYMERS
Gunther Vock, Augsburg, Hans Seelig, Schwabmunchen, and Dieter Paulin, Bobingen, Germany, assignors to Farbwerke Hoechst Aktiengesellschaft, Frankfurt am Main, Germany
Filed Mar. 10, 1969, Ser. No. 805,506
Claims priority, application Germany, Mar. 14, 1968,
P 17 10 620.6
Int. Cl. D01d 5/08
U.S. Cl. 264—178F                    8 Claims

ABSTRACT OF THE DISCLOSURE

Process for the manufacture of monofilaments of circular cross-section made of synthetic, linear high-polymers by spinning said high-polymers through circular spinneret openings into a liquid bath and deviating the freshly spun monofilament in the bath on their path of travel to the takeup on a deviating device designed as turnable guiding element, which conducts the monofilaments along the curve performed by them without guidance in the liquid bath on their path of travel to the take away into guide grooves designed as rounded off, wedge-shaped grooves whose bottoms have as radii of curvature the radii of the undrawn monofilaments, one guide groove being provided for each monofilament. As the deviating device there is used an easily turning roller or a disposition of several easily turning small rollers which have parallel axes. The monofilaments are guided into grooves which have to be exactly adjusted to the diameters of these monofilaments; said disposition of one or several small deviating rollers for carrying out the process of the invention also constituting an object of the present invention.

---

The present invention relates to a process and device for the manufacture of monofilaments of circular cross-section made of synthetic linear high-polymers.

In the manufacture of thick monofilaments (having a diameter of 0.1 mm., or more) of synthetic linear polymers shaped, for example, from the melt, the raw materials are spun by means of a screw extruder into a liquid bath in which the spun monofilaments is cooled, in which process solidification sets in progressing from the exterior to the interior of the monofilament. For a variety of uses, for example for processing into meshes, it is necessary that the cross-section of the monofilament should be circular, in which case it is of decisive importance that the monofilament is treated and conducted with special care in the cooling bath so long as it is still soft and in the plastic state since otherwise there occur deformations of the cross-section which cannot be compensated in the further process.

Processes for the manufacture of monofilaments having a circular cross-section have been described in many publications. It has been recommended, for example, to spin polyesters having a melt viscosity of 4500 to 12,000 poises at 280° C. and to draw the monofilaments after cooling (Japanese specification as laid open to public inspection 290/66). Also the temperature of the cooling bath used is of special importance with regard to the properties of the monofilament (German Auslegeschrift 1,236,130). In this connection, it has also been proposed to spin monofilaments of polyethylene glycol terephthalate having a titer of 500 deniers or more at a temperature of 300° C. to obtain a circular cross-section, in which case the temperature of the solidification bath should lie above the second order transition temperature, for example at 90° C. (Japanese specification as laid open to public inspection No. 23,208/65).

It has been proposed, moreover, that in the manufacture of monofilaments of high molecular weight aromatic polyesters, the temperature of the monofilaments should be situated at the second order transition point of the polyester at the place of the first deviation in the cooling bath. In this case it is advantageous when the deviation roller used is pivoted on a spiral spring (German Auslegeschrift 1,191,929).

It has been found, however, that all these measures are insufficient when the monofilaments have to meet very high standards with regard to circularity and uniformity of the diameter of the monofilaments, particularly in the case of melt-spun polyester monofilaments, the interior of which—in spite of the cooling bath—is still soft and readily deformable when being passed over the first deviating roller so that deformations occur time and again. This applies especially to thick monofilaments which require a longer solidification period. They are partially still in the plastic state when being led over the first guide roller so that flattening of the monofilament at the side of contact with the roller cannot be prevented. The transverse orientation of the molecules which occurs upon cooling thick monofilaments is circular-symmetrical in the case of an ideal monofilament. When deformations occur, this symmetry is disturbed so that during the work-up, for example on drawing, shrinking and fixing the monofilament, non-uniformities may ensue.

Now we have found that monofilaments of circular cross-section made of synthetic linear high-polymers can be obtained by spinning said high-polymers through circular spinneret openings into a liquid bath and deviating the freshly spun monofilaments in the bath on their path of travel to the takeup on a deviating device by using (as the deviating device) a turnable guiding element which conducts the monofilaments along the curve performed by them without guidance in the liquid bath on their path of travel to the take away into guide grooves designed as rounded off, wedge-shaped grooves whose bottoms have as radii of curvature the radii of the undrawn monofilaments, one guide groove being provided for each monofilament. As the deviating device there is advantageously used an easily turning roller whose diameter corresponds to the curve performed by the monofilaments without guidance in the liquid bath on their path of travel to the take away and which conducts the monofilaments along the curve performed by them without guidance in the liquid bath on their path of travel to the takeup into guide grooves designed as rounded off, wedge-shaped grooves whose bottoms have as radii of curvature the radii of the undrawn monofilaments, one guide groove being provided for each monofilament.

It is another object of this invention to provide a deviating device for carrying out the above-described process for the manufacture of monofilaments of circular cross-section made of synthetic linear high-polymers. The deviating device consists of an easily turning roller whose diameter corresponds to the curve performed by the monofilaments without guidance in the liquid bath on their path of travel to the takeup, and which is provided with guide grooves designed as rounded off, wedge-shaped grooves for guiding the monofilaments, said guide grooves having an angle of from 0° to 30° and whose bottoms have as radii of curvature the radii of the undrawn monofilaments, the number of the guide grooves corresponding to the number of the monofilaments to be deviated.

In another advantageous modification of the present invention there is used as the deviating device a disposition of several small rollers which turn easily and which have parallel axes, said rollers conducting the monofilaments along the curve performed by them without guidance in the liquid bath on their path of travel to the take away into guide grooves designed as rounded off, wedge-shaped grooves whose bottoms have as radii of curvature the radii of the undrawn monofilaments, each roller being provided with one guide groove for each monofilament.

Since the deviating roller according to the invention would have to be especially large in the case of thick monofilaments because these monofilaments would, without guidance, only perform a very wide curve in a sufficiently large liquid bath, it is advantageous to use in this case, instead of a single deviating roller, several small rollers turning easily and having parallel axes, the construction of each small roller corresponding to the description above. Also this disposition of several small deviating rollers constitutes an object of the present invention.

As monofilaments deviated in the manner according to the invention, there may be used especially those which are made of linear polyesters and copolyesters. As acid components of these polyesters and copolyesters there may be mentioned, for example, sulfodibenzoic acid, sulfoisophthalic acid, 4,4'-diphenyldicarboxylic acid, isophthalic acid, especially terephthalic acid, as diol components there may be mentioned dihydroxydiethylether, 2,2-dimethyl-propanediol, 1,4-dimethylol cyclohexane and especially ethylene glycol; preferred polyesters are polyethylene glycol terephthalate and poly-(1,4-dimethylol-cyclohexane-terephthalate). Since the polyesters and copolyesters of the said type are practically only spun according to the melt-spinning process, the liquid bath, in which the monofilament is deviated, serves in this case as the cooling bath. It is, of course, also possible to use in the process of the invention other synthetic linear high-polymers such as, for example, polyolefins, polyvinyl chloride or a variety of polyamides (polycaprolactam etc.) which are likewise mainly worked up from the melt, as well as polymers which can only be worked up by the wet-spinning process such as, for example, most of the poly-$\beta$-lactams. In the latter case (wet-spinning) the liquid bath is used as the precipitating bath. However, as mentioned above, linear polyesters that may be worked up by a melt-spinning process are to be preferred. Said linear polyesters are spun on a screw extruder in the molten state, i.e., for example in the case of polyethylene glycol terephthalate, at 275° to 295° C., through a spinneret having circular openings vertically into a liquid bath used as cooling bath (water or another solvent which is inert towards the spinning material), the surface of the liquid bath being of from several millimeters to several centimeters distant from the spinneret. The bath temperature lies preferably within the range of from 60° to 90° C., the deviation takes place, depending on the thickness of the monofilament, after 10 cm. (thin monofilaments) up to 200 cm. (thick monofilaments), by means of the deviating device of the invention. The spun and cooled monofilaments are then drawn as usual, for example polyethylene glycol terephthalate monofilaments being drawn in a ratio of from about 1:4 to about 1:6 at the usual temperatures, and fixed with or without shrinkage, which depends on the intended use.

The cooling bath must, of course, be so large that the monofilament can be drawn by the stationary takeup over the rim of the bath without constraint and without suffering inner deformations. Due to the most favorable depth of immersion of the monofilament being given in each individual case, the path of the monofilament is fixed but only to such an extent that it can determine itself its curve (natural bend) without suffering inner deformations. Along this natural bend guidance takes place by the device according to the invention. Those skilled in the art know that this natural bend depends, apart from the surface area and the temperature of the liquid bath, also on the depth of immersion and the thickness of the monofilament. It is most advantageous to ascertain the natural bend by a simple preliminary test since the dependence of the width of the curve on the four aforesaid factors can be indicated by an exact mathematical correlation with difficulty only.

The monofilaments obtained according to the process of the present invention with the use of the device according to the invention may be processed into wires, conveyor belts and a variety of other articles which are usually manufactured with such monofilaments made of plastics materials. Non-circularity of the monofilaments results in flaws in the meshes which are then more rapidly worn out by use. In the case of wires, non-circularity results in non-uniformities which impair the quality of the paper. Such impairments of the quality due to non-circularity are practically avoided with the use of the monofilaments which have been deviated in accordance with the process of the present invention.

The accompanying drawing shows, by way of example, three forms of a device in accordance with the invention. FIG. 1a/b shows the device in the form of a roller 1 being provided with only one guide groove 2 for only one monofilament, in end elevation (FIG. 1a) and plan elevation (FIG. 1b). The roller easily revolves about its middle axis; it may be made of metal (preferably a light metal) or another material which should be as light as possible and have as high as dimensional stability as possible, for example a plastics material which is dimensionally stable both with respect to the liquid bath and in the hot. The angle of guide groove 2 designed in the form of a rounded off, wedge-shaped groove should not exceed 30° and should preferably lie within the range of from 10° to 20°, the depth of the groove being 5 to 100 mm., preferably 10 to 50 mm. The bottom 3 of groove 2 should be adjusted as accurately as possible to the cross-section of the undrawn monofilament to be guided. 4 designates some round cut-outs in roller 1 enabling a low own weight of the roller. FIG. 2 shows a modification of the device according to the invention adapted for uniformly deviating a variety of monofilaments. Roller 5 which can also easily be resolved and which is made of a light material has several guide grooves 2.

FIG. 3 shows a form of a device in accordance with the invention which is used in the case of thicker monofilaments, the single roller of FIG. 1 or 2 being replaced by several smaller rollers whose construction is entirely analogous to that of the rollers of FIG. 1 or 2. The disposition of these smaller rollers 6 conducts the monofilament 7 without constraint along the curve which it would naturally perform ("natural bend").

It goes without saying that rollers 6 need not be of the same size; they may also differ in size, the only condition being that they are arranged in a manner such that the monofilaments are neither conducted along a narrower curve than would correspond to their natural bend nor deformed in any other way. FIGS. 1 to 3 do not show the takeup for the monofilaments installed outside the cooling bath.

The following example serves to illustrate the invention, but it is not intended to limit it thereto:

EXAMPLE

A raw material of polyethylene glycol terephthalate having a specific viscosity of 0.8 (measured in phenol/tetrachloroethane 3:2 at 25° C. in a concentration of 1 g./100 ml.) was spun by means of a screw extruder at 280° C. (in the mass) at a rate of 104 g./min. through a spinneret opening having a diameter of 7 mm. into a water bath having a temperature of 70° C. and drawn off at a rate of 5 m./min. After a path of travel of 1.2 m., the monofilament was deviated by means of the deviating devices described hereunder and then drawn in a ratio of 1:4.8, whereby it acquired a final diameter of 2.0 mm.:

(a) By means of a deviating roller according to the invention having an effective diameter of 200 mm. (measured on the bottom of the groove) and a depth of the wedge-shaped groove 25 mm., an angle of 15° and a roundness of the bottom of the groove corresponding to $r$ (radius)=2.2 mm. Since the bottom of the groove in this case corresponded exactly to the diameter of the undrawn monofilament and since also the dimensions of the roller had been chosen in the best possible way, a monofilament was obtained having the highest degree of roundness possible, (b) By means of a stationary roller whose effective diameter was 30 mm. and whose circumference was provided with indented grooves which represent, in sectional view, a demi-circle having a radius of 3 mm. When operating with this stationary roller having too small a diameter, it could not be avoided that the monofilament was compressed on one side in its longitudinal direction and that it was elongated on the opposite side. Moreover, the monofilament was flattened in a high degree in the guide groove which was not adapted to its diameter since it was supported only by one surface line.

To measure the test results, the maximum and the minimum diameter of the monofilaments were determined by microscopic inspection of the undrawn monofilaments at 10 places, respectively, which were situated at a distance of 10 cm. from one another. The following table indicates for both tests the mean values of the 20 determinations of diameter carried out in each case as well as the mean values of the 10 differences between the largest and the smallest diameter, respectively. The quotient ascertained from the mean value of the differences and the mean value of the absolute diameter is designated as noncircularity. The mean quadratic scatterings (standard deviations) are also given.

| Example | a | b |
|---|---|---|
| Diameter, microns | (4,410±60) | (4,400±300) |
| $\phi_{max.}-\phi_{min.}$, microns | (100±50) | (540±1503) |
| Noncircularity | 0.023 | 0.12 |

We claim:

1. In a process for the manufacture of monofilaments of circular cross-section made of synthetic linear high-polymers by spinning the high-polymers through circular spinneret openings into a liquid bath and conveying the freshly spun monofilaments to a takeup device by passing the monofilaments over a deviating device, the improvement which comprises guiding the monofilaments in the liquid bath along the curve over which the monofilaments would have traveled in the absence of a deviating device in the liquid bath, utilizing as the deviating device at least one easily turning roller having a guide groove which is wedge shaped and rounded off terminating in a bottom of the same radius of curvature as the radius of the undrawn monofilament with one guide groove being provided for each monofilament, and disposing each monofilament in its mating groove bottom as it travels from the spinneret to the takeup device.

2. In the process of claim 1 wherein the deviating device is a roller having a diameter corresponding to said curve.

3. In the process of claim 1 wherein the deviating device is a plurality of small rollers having parallel axis and whose grooves are disposed along said curve.

4. In the process of claim 1 wherein the linear high-polymer is selected from the group consisting of polyolefins, polyvinyl chloride, polyamides, and linear polyesters and co-polyesters, the spinning being a wet spinning process, and the liquid bath being a coagulation bath.

5. In the process of claim 1 wherein the linear high-polymer is selected from the group consisting of polyolefins, polyvinyl chloride, polyamides, and linear polyesters and co-polyesters, the spinning being a melt spinning process, and the liquid bath being a quenching bath containing a solvent inert to the spinning material with the bath temperature being in the range of from 60° to 90° C.

6. A deviating device for use in the manufacture of monofilaments of circular cross-section wherein the monofilaments are conveyed over the deviating device in a liquid bath from a spinneret to a takeup device along the same curve over which the monofilaments would have traveled in the absence of the deviating device, comprising an easily turning roller having a diameter corresponding to said curve, said roller having a rounded off, wedge-shaped guide groove in which a single monofilament travels, and said guide groove having an angle of from 0° to 30° with a bottom having a radius of curvature equal to the radius of the undrawn monofilament.

7. A device as set forth in claim 6 wherein a plurality of said guide grooves are coaxially arranged for guiding a like number of monofilaments.

8. A deviating device for use in the manufacture of monofilaments of circular cross-section wherein the monofilaments are conveyed over the deviating device in a liquid bath from a spinneret to a takeup device along the same curve over which the monofilaments would have traveled in the absence of the deviating device, comprising a plurality of small easily turning rollers having parallel axes, each of said rollers having a rounded off, wedge-shaped guide groove in which a single monofilament travels, each groove having an angle of from 0° to 30° with a bottom having a radius of curvature equal to the radius of the undrawn monofilaments, the plurality of rollers being arranged with their grooves disposed along said curve, and each roller having a number of grooves corresponding to the number of monofilaments to be deviated.

References Cited
UNITED STATES PATENTS

| 2,875,019 | 2/1858 | Spohn et al. | 8—130.1 |
| 3,002,804 | 10/1961 | Killian | 8—130.1 |
| 3,095,606 | 7/1963 | Scott | 264—178F |
| 3,120,027 | 2/1964 | Baggett et al. | 18—8 |
| 3,250,834 | 5/1966 | Collins | 264—176 |
| 3,276,076 | 10/1966 | Ryan et al. | 264—176 |

JAY H. WOO, Primary Examiner

U.S. Cl. X.R.

18—8B, 8V; 19—66T; 264—184